(12) United States Patent  
Fredinburg et al.

(10) Patent No.: US 8,898,730 B1  
(45) Date of Patent: Nov. 25, 2014

(54) INTERACTIVE PRIVACY SETTINGS LAYER

(71) Applicants: Dan Fredinburg, San Francisco, CA (US); Alma Whitten, London (GB)

(72) Inventors: Dan Fredinburg, San Francisco, CA (US); Alma Whitten, London (GB)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/669,225

(22) Filed: Nov. 5, 2012

(51) Int. Cl.  
*G06F 21/00* (2013.01)

(52) U.S. Cl.  
USPC .................................................. 726/1

(58) Field of Classification Search  
None  
See application file for complete search history.

(56) References Cited

U.S. PATENT DOCUMENTS

| | | | |
|---|---|---|---|
| 7,953,730 B1 * | 5/2011 | Bleckner et al. | 707/722 |
| 8,099,683 B2 * | 1/2012 | Garbow et al. | 715/856 |
| 8,225,376 B2 * | 7/2012 | Zuckerberg et al. | 726/4 |
| 8,306,934 B2 * | 11/2012 | Chen et al. | 706/45 |
| 8,341,146 B1 * | 12/2012 | Bleckner et al. | 707/722 |
| 8,402,548 B1 * | 3/2013 | Muriello et al. | 726/26 |
| 8,452,793 B2 * | 5/2013 | Anick et al. | 707/767 |
| 8,676,892 B2 * | 3/2014 | Su et al. | 709/204 |
| 8,756,278 B2 * | 6/2014 | Sittig et al. | 709/204 |
| 2005/0144158 A1 * | 6/2005 | Capper et al. | 707/3 |
| 2008/0005069 A1 * | 1/2008 | Payne et al. | 707/3 |
| 2008/0120289 A1 * | 5/2008 | Golan et al. | 707/5 |
| 2008/0177735 A1 * | 7/2008 | Garbow et al. | 707/5 |
| 2009/0094138 A1 * | 4/2009 | Sweitzer et al. | 705/27 |
| 2010/0318571 A1 | 12/2010 | Pearlman et al. | |
| 2011/0004922 A1 | 1/2011 | Bono et al. | |
| 2011/0154254 A1 * | 6/2011 | Singh | 715/810 |
| 2011/0247081 A1 | 10/2011 | Shelton | |
| 2012/0158766 A1 * | 6/2012 | Chuang et al. | 707/766 |
| 2012/0166989 A1 * | 6/2012 | Brown et al. | 715/768 |
| 2012/0271883 A1 * | 10/2012 | Montoya et al. | 709/204 |
| 2012/0324042 A1 * | 12/2012 | Graham et al. | 709/217 |
| 2013/0110810 A1 * | 5/2013 | Eidesen et al. | 707/708 |
| 2013/0151613 A1 * | 6/2013 | Dhawan et al. | 709/204 |

OTHER PUBLICATIONS

"The Privacy Badge Revisited—Enhancement of a Privacy-Awareness User Interface for Small Devices." Gehring, Sven, et al.; 2008.

* cited by examiner

*Primary Examiner* — Michael R Vaughan  
*Assistant Examiner* — Richard McCoy  
(74) *Attorney, Agent, or Firm* — Procopio, Cory, Hargreaves & Savitch LLP

(57) ABSTRACT

Systems and methods are directed to adjusting a privacy setting associated with an online computer software application. The systems and methods may provide a privacy settings layer containing privacy settings of the computer software application that is overlaid on the operating layer of the computer software application. Adjustments made to the privacy settings layer may be propagated to the online computer software application, whereupon the operating layer may be regenerated or adjusted to reflect the changes made to the privacy settings layer.

18 Claims, 10 Drawing Sheets

FIG. 1

+Joe Web Images Videos Maps News Shopping Mail More ▾ joelaylor@mail | 0 | Share... 🔍 ✱

Search soccer

Hide Privacy Controls

About 843,000,000 results (0.38 seconds)

Everything
Images
Maps
Videos
Shopping
Blogs
More

New York, NY
Change Location

Any time
Past hour
Past 24 hours
Past week
Past 3 weeks
Past month
Past year
Custom range...

All results
Sites with images
Related searches

Ad - Why this ad?
Soccer.com: Official Site - Great Deals on Everything Soccer.
www.soccer.com
Free Shipping on Orders Over $100!
   Soccer Footwear   Women's Soccer Gear
   Replica Jerseys   Youth Soccer Gear
   Gift Cards   Deal of the Day

FIFA.com - Fédération Internationale de Football Association (FIFA)
www.fifa.com/
29 minutes ago - FIFA Beach Soccer World Cup - News | Matches | Highlights - FIFA Women's World Cup Germany 2011   News | Matches | Highlights...

Soccer.COM - Soccer shoes, Soccer Jerseys, Soccer Balls...
www.soccer.com/
Shop for all your soccer equipment and apparel needs from EUROSPORT including soccer shoes, replica soccer jerseys, soccer balls, team uniforms, ...
Footwear - Jerseys - Nike - Adidas

Soccer / Football News and Scores - ESPN Soccernet
soccernet.espn.go.com/
Soccer / Football news, scores, stats, and features from the world's leading soccer website, ESPN Soccernet.

Association football - Wikipedia, the free encyclopedia
en.wikipedia.org/wiki/Association_football
Association football, more commonly known as football or soccer, is a sport played between two teams of eleven players with a spherical ball. At the turn of the ...

New York Coed Soccer League

---

Privacy Presets

Visibility |———□———|

Personalization |——□————|

View all Privacy Settings

Instant Predictions
☐ ON  ☑ OFF

Where results open
☐ Open each selected result in a new browser window.

Results per page
10  20  30  40  50           100
|———————□———|
Faster                       Slower SafeSearch Filters
|—————□——————|
No filtering  Moderate     Strict Recent Searches
soccer gloves
cleats
new york, ny View your Web History Top Interests
soccer
sports
didgeridoo View your Personalization Dashboard Save

INTERACTIVE PRIVACY SETTINGS LAYER

BACKGROUND

1. Field

The subject matter described herein relates to ways the privacy settings of an application (e.g. online, mobile device, apparatus, etc.) can be adjusted interactively while a user continues to use the application, and more specifically, to a privacy settings layer that is overlaid on the application, the privacy settings layer being adjustable in real time.

2. Background Information

To date, applications may have privacy settings that require a user to navigate through several interfaces of the application to reach an interface that provides the user with the ability to view and/or modify the privacy settings. Users may thus be discouraged from modifying the privacy settings of related art applications due to the difficulty and inconvenience of navigating through the several interfaces of the application to reach the privacy settings. As a result, the user may not maintain the privacy settings for the application.

Figure 1:
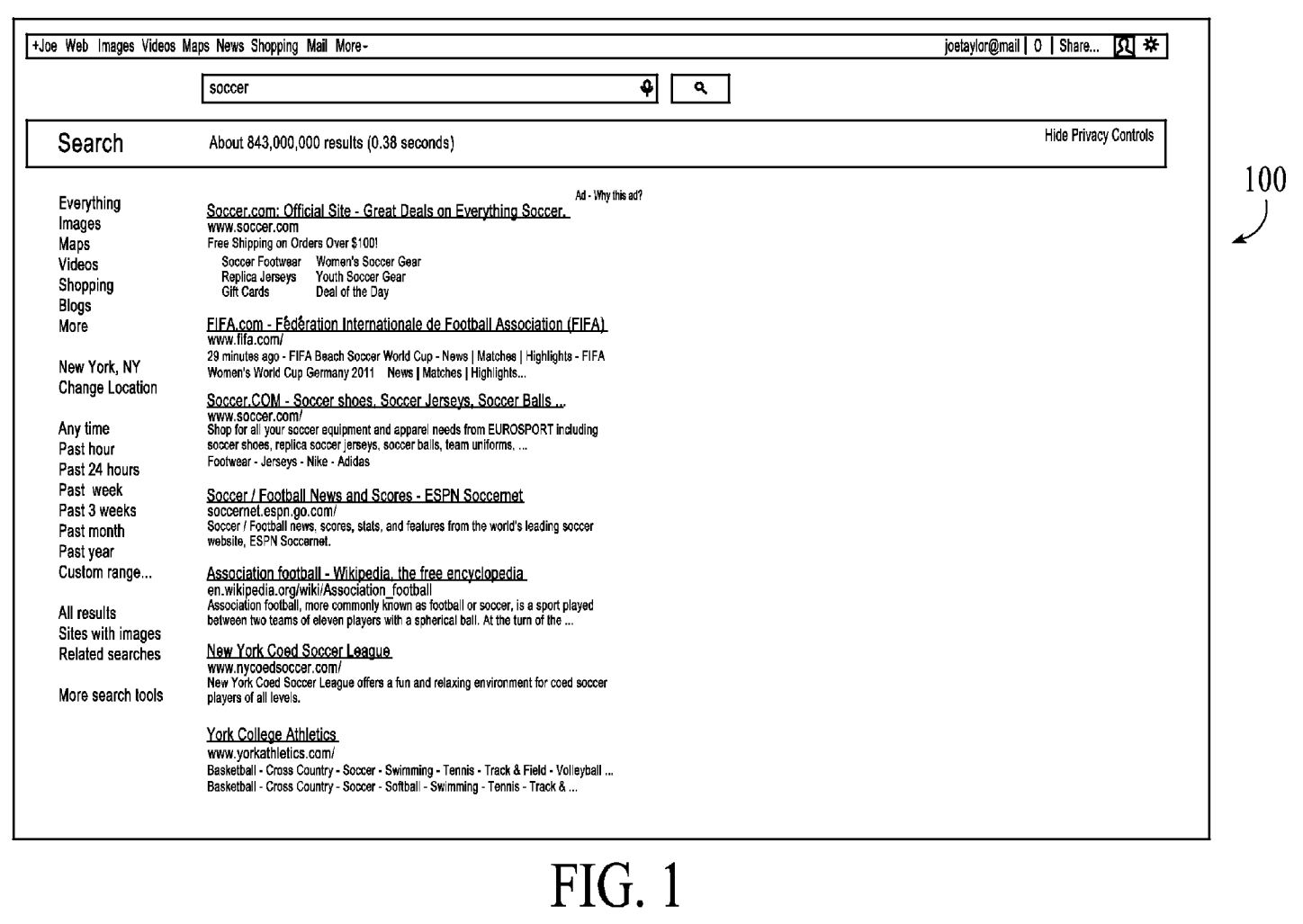

FIG. 1 illustrates an example interface for an application. For example, a user query directed to the term "soccer" has been performed, and results of the user query have been provided. In the example depicted in FIG. 1, the privacy settings of the application are not immediately present on the interface directed to the user query (e.g., search). The user may thus need to navigate through several additional interfaces (e.g., online website screens) within the application 100 before the user can reach the interface that includes the privacy settings.

Related art applications have attempted to address the above problem by displaying privacy settings for instances (e.g., instantiations) within the application. For example, a social media service application may allow the user to adjust the privacy settings of each individual status post that the user submits to the application. Such related art applications may utilize a window (e.g., pop-up window) above the status post to permit the user to access the privacy settings of the status post. However, the user cannot adjust the privacy settings of the application, but only the particular instance (e.g. status post). Thus, the privacy setting of the application thereby remains unaffected, and the user still needs to navigate through the multiple interfaces to reach the interface that includes privacy settings for the application. Further, the privacy setting of the particular instance does not propagate to other instances of the application, thereby requiring the user to separately and individually adjust each instance of the application.

SUMMARY

Aspects of the example embodiments described herein include a method of adjusting a privacy setting associated with an online computer software application. The method may involve providing an operating layer directed to execution of the online computer software application; providing a privacy setting layer directed to privacy settings of the application, the privacy settings layer overlaid on the operating layer, propagating an adjustment to the privacy settings received by the privacy settings layer to the online computer software application, and adjusting the operating layer based on the privacy setting adjustment.

Additional aspects include the method of adjusting a privacy setting associated with an online computer software application, wherein the privacy settings may further include settings for visibility of data, including at least one of a public setting, a friends setting and a personal setting.

Additional aspects include the method of adjusting a privacy setting associated with an online computer software application, wherein adjusting the operating layer based on the privacy setting adjustment may further involve changing a view of the application to one of a public view, a friends view, or a personal view of the application based on the settings for the visibility of the data.

Additional aspects include the method of adjusting a privacy setting associated with an online computer software application, wherein the privacy settings may include settings for enabling or disabling sharing of data. The operating layer may be adjusted such that the application adds or removes the data based on the settings for enabling or disabling the sharing of data.

Additional aspects include the method of adjusting a privacy setting associated with an online computer software application, wherein the application is a sharing application (e.g., photo sharing, document sharing, profile information, social blogging, reviews, location history, facial recognition, personalization user models, and general language, security, and other settings).

Additional aspects include the method of adjusting a privacy setting associated with an online computer software application, wherein the privacy settings may include personalization settings, the application is personalized in response to the personalization settings, and the operating layer is adjusted by applying the personalization settings to the application.

Additional aspects include a non-transitory computer readable medium storing instructions for adjusting a privacy setting associated with an online computer software application. The instructions may involve providing an operating layer directed to execution of the online computer software application; providing a privacy setting layer directed to privacy settings of the application, the privacy settings layer overlaid on the operating layer, propagating an adjustment to the privacy settings received by the privacy settings layer to the online computer software application, and adjusting the operating layer based on the privacy setting adjustment.

Additional aspects include the non-transitory computer readable medium storing instructions of adjusting a privacy setting associated with an online computer software application, wherein the privacy settings may further include settings for visibility of data, including at least one of a public setting, a friends setting and a personal setting.

Additional aspects include the non-transitory computer readable medium storing instructions of adjusting a privacy setting associated with an online computer software application, wherein adjusting the operating layer based on the privacy setting adjustment may further involve changing a view of the application to one of a public view, a friends view, or a personal view of the application based on the settings for the visibility of the data.

Additional aspects include the non-transitory computer readable medium storing instructions of adjusting a privacy setting associated with an online computer software application, wherein the privacy settings may include settings for enabling or disabling sharing of data. The operating layer may be adjusted such that the application adds or removes the data based on the settings for enabling or disabling the sharing of data.

Additional aspects include the non-transitory computer readable medium storing instructions of adjusting a privacy setting associated with an online computer software application, wherein the application is a sharing application.

Additional aspects include the non-transitory computer readable medium storing instructions of adjusting a privacy setting associated with an online computer software application, wherein the privacy settings may include personalization settings, the application is personalized in response to the personalization settings, and the operating layer is adjusted by applying the personalization settings to the application.

Additional aspects include a server that executes one or more units on a processor. The server may include a providing unit configured to provide an operating layer directed to execution of the online computer software application and to provide a privacy setting layer directed to privacy settings of the application, the privacy settings layer overlaid on the operating layer, an adjusting unit configured to propagate an adjustment to the privacy settings received by the privacy settings layer to the online computer software application and to adjust the operating layer based on the privacy setting adjustment.

Additional aspects include the server that executes one or more units on a processor, wherein the privacy settings may include settings for visibility of data, including at least one of a public setting, a friends setting and a personal setting.

Additional aspects include a server that executes one or more units on a processor, wherein the adjusting unit is configured to adjust the operating layer based on the privacy setting adjustment by changing a view of the application to one of a public view, a friends view, or a personal view of the application based on the settings for the visibility of the data.

Additional aspects include a server that executes one or more units on a processor, wherein the privacy settings may include settings for enabling or disabling sharing of data, wherein the adjustment unit adjusts the operating layer such that the application adds or removes the data based on the settings for enabling or disabling the sharing of data.

Additional aspects include a server that executes one or more units on a processor, wherein the application is a sharing application.

Additional aspects include a server that executes one or more units on a processor, wherein the privacy settings comprise personalization settings, the application is personalized in response to the personalization settings, and the adjustment unit adjusts the operating layer by applying the personalization settings to the application.

BRIEF DESCRIPTION OF THE DRAWINGS

FIG. 1 illustrates an example interface for an application.

FIG. 3 illustrates an example of changing a privacy setting in the privacy settings layer overlaid on the general interface, in accordance with an example embodiment.

DETAILED DESCRIPTION

Figure 2:
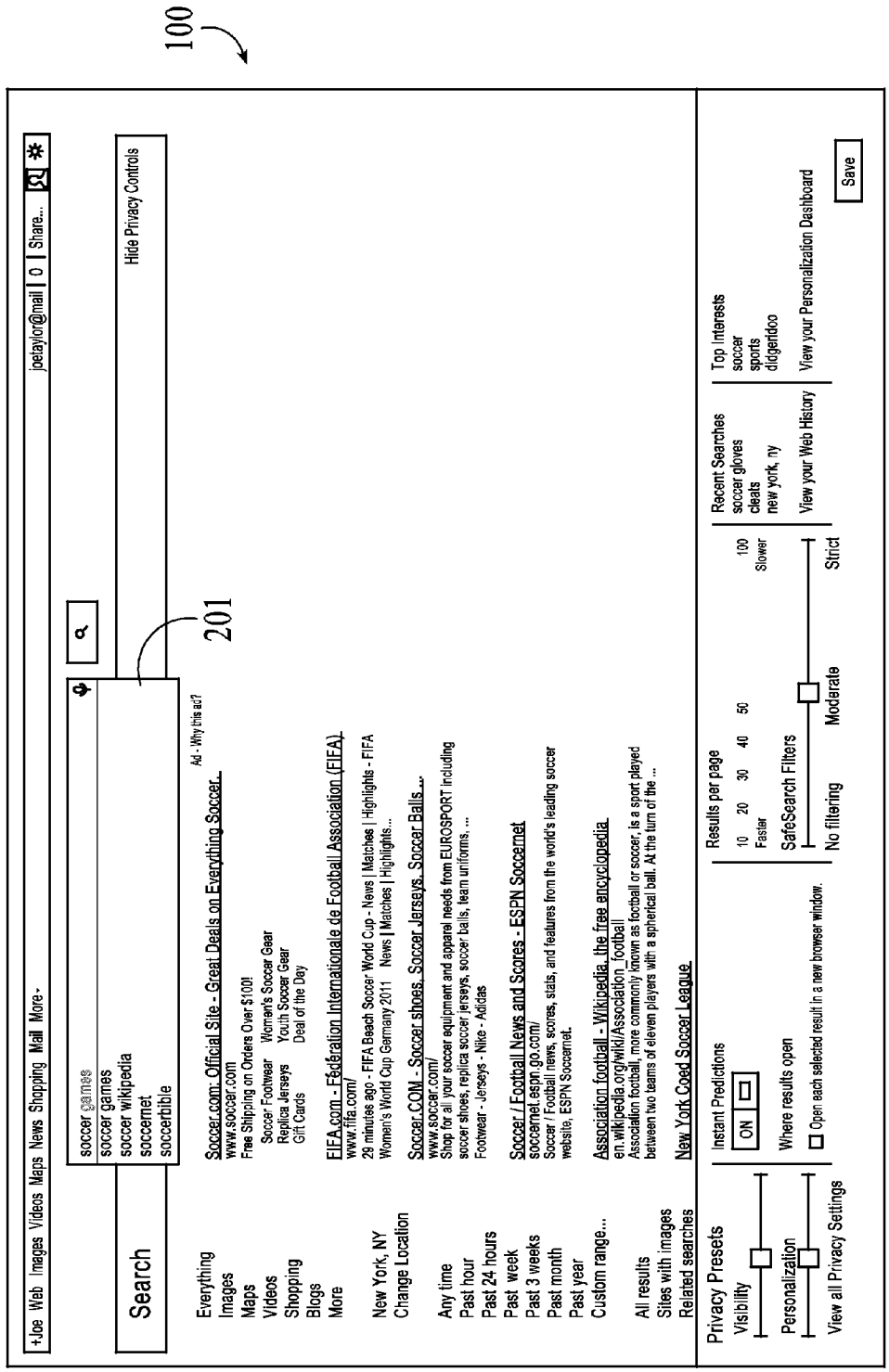
FIG. 2 illustrates a general interface with a privacy settings layer overlaid on the general interface, in accordance with an example embodiment.

Hereinafter, aspects will be described in detail with reference to the accompanying drawings, in which one or more example embodiments are shown, so as to be easily realized by people who are familiar with this field. In the following description, like drawing reference numerals are used for the like elements, even in different drawings. Descriptions of well-known functions or constructions are omitted for clarity.

In contrast to related art applications that have privacy settings provided as a separate interface from the other interfaces of the application, example embodiments described herein provide privacy settings on a user interface layer that is overlaid on the application layer, such that the privacy settings can be accessed by the user, independent of the current interface that the user is accessing. The overlaid user interface layer provides an interactive experience, such that the user can observe and modify privacy settings associated with the application in real time without requiring additional navigation away from the current interface that the user is accessing.

As used herein, the term "sharing" includes, but is not limited to, photo sharing, document sharing, profile information, social blogging, reviews, location history, facial recognition, personalization user models, and general language, security, and other settings FIG. 2 illustrates an interface with an overlaid privacy settings layer, in accordance with an example embodiment. In the example depicted in FIG. 2, the privacy settings layer 200 is overlaid at the bottom of the operating layer of the application 100, and includes privacy options such as privacy presets. For example, the privacy settings layer 200 is an overlay that includes an instant prediction setting 300 (e.g., "Instant Predictions"), which may be set to be enabled or disabled by the selection of an object on the privacy settings layer 200, such as the "ON" object or the "OFF" object. In the present example embodiment, these objects are buttons. However, other objects may be substituted therefor as would be understood by one skilled in the art. In the example embodiment of FIG. 2, the privacy settings layer 200 is set to enabled, thereby generating instant predictions 201. More specifically, possible queries associated with "soccer", such as "soccer games" or the like, are provided to the user in the user query interface.

As shown in FIG. 2, the user is actually in the process of entering a user query to generate the instant predictions 201, while the privacy settings layer 200 is displayed. Thus, the user can enable or disable privacy settings while in the process of performing a user query, without interference with the operation of the application 100.

FIG. 3 illustrates an example of changing a privacy setting in the privacy settings layer overlaid on the general interface, in accordance with an example embodiment. The application 100 and the privacy settings layer 200 of FIG. 2 are included in FIG. 3, and operate in substantially the same manner as FIG. 2, and description thereof is omitted for the sake of clarity.

In example embodiments as shown in FIG. 3, privacy settings of the operating layer may be adjusted by the propagation of adjustments made to privacy settings in the privacy settings layer. In the example depicted in FIG. 3, the instant predictions setting 300 is changed from an enabled value, as depicted in FIG. 2, to a disabled value. The setting change is propagated to the application, and the operating layer is adjusted to incorporate the setting change. Thus, the application is executed with respect to the user query on the operating layer without providing the instant predictions, as depicted in FIG. 3. Thus, FIG. 3 does not have the instant predictions 201 as depicted in FIG. 2. More specifically, only the actual query entered by the user is displayed, and no potential instant predictive queries are provided. Additionally, the overlay of FIG. 3 illustrates a value of results per page (e.g., 10), filtering strength (e.g., "Moderate" as explained in greater detail below), and information on recent searches and top interests of the user. Further, the overlap may be used by the user to access web history, or further personalization information (e.g., an interface such as a "personalization dashboard").

Figure 4:
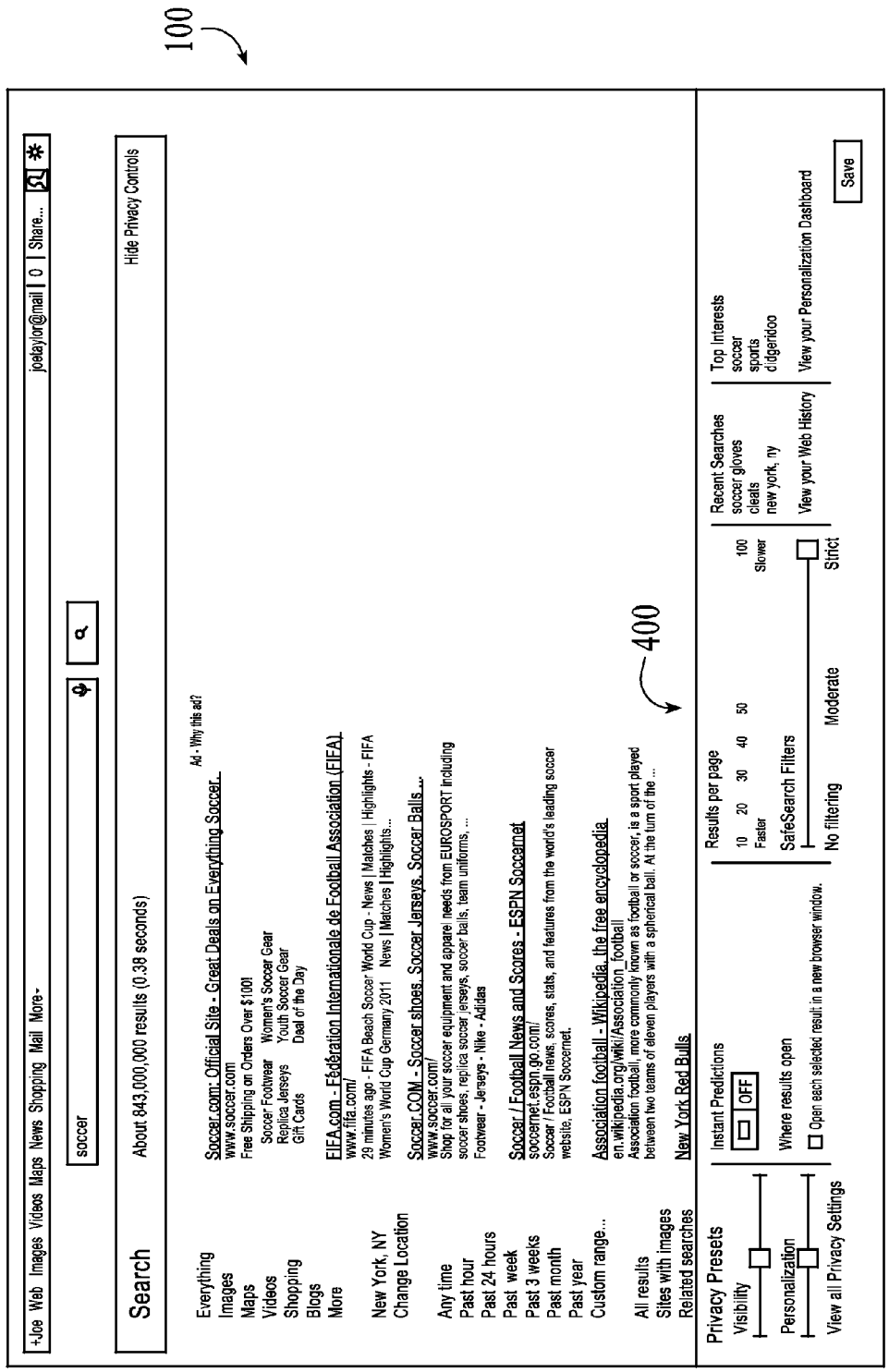
FIG. 4 illustrates changing a privacy setting in the privacy settings layer overlaid on the general interface, in accordance with another example embodiment.

FIG. 4 illustrates another example of changing a privacy setting in the privacy settings layer overlaid on the interface, in accordance with an example embodiment. In the example depicted in FIG. 4, the "SafeSearch Filters" setting 400 (e.g., an indication of a level of "No filtering", "Moderate", or "Strict") in the privacy settings layer 200, is changed from "Moderate" (as originally depicted in FIG. 3) to "Strict". The setting change is propagated to the application, and the operating layer 100 is adjusted to incorporate the setting change, which has the application executed on the operating layer without SafeSearch Filters, as depicted in FIG. 4. The search results of FIG. 4 thereby differ than the search results in the example of FIG. 3, where SafeSearch Filters is enabled. As another example, "New York Red Bulls" is shown as a sixth-highest ranked search result with a "Strict" filter setting, since "New York Coed Soccer League" was filtered out of the search results as not meeting the "Safe" criteria. For example, and as an alternative illustration, a user may use a search term that would be filtered out, and have the results for a search result corresponding to that search be filtered out according to the "strict" setting, as not meeting the "safe" criteria. The filtering may be determined by any method of online filtering as would be known to one of ordinary skill in the art.

Figure 5:
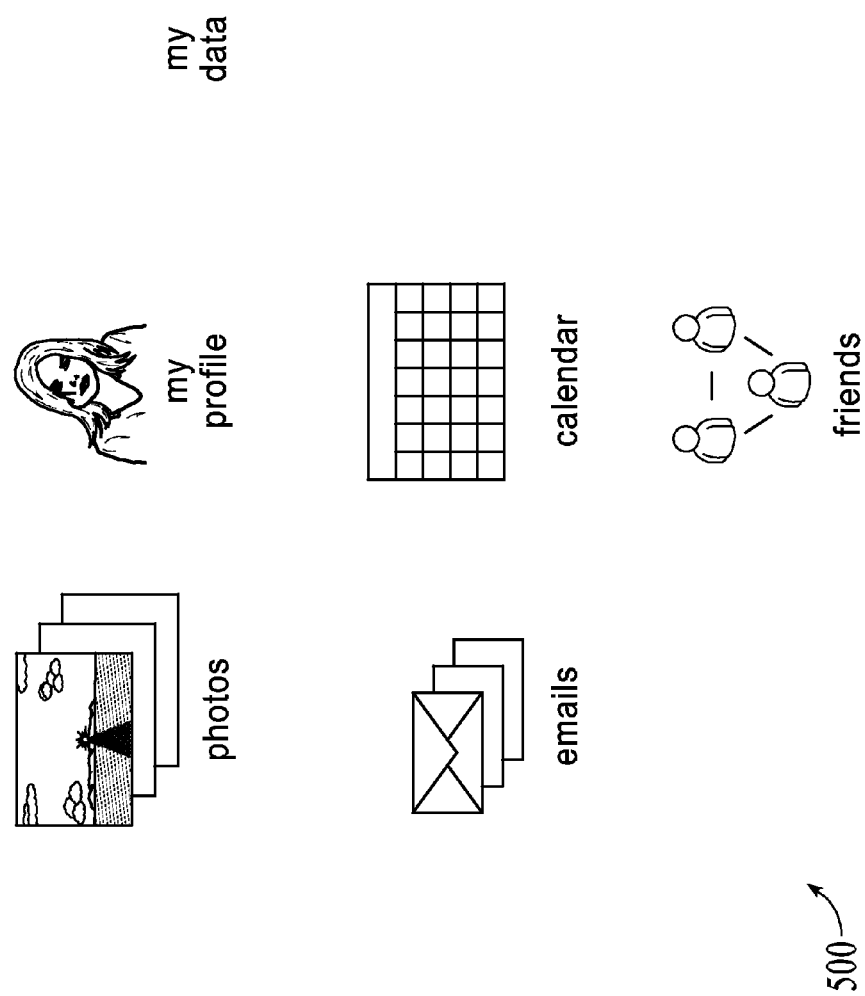
FIG. 5 illustrates an interface for user data, in accordance with an example embodiment.

FIG. 5 illustrates an interface for user data, in accordance with an example embodiment. In example embodiments, personal data that is utilized across several applications may be provided in a centralized interface 500. In the example depicted in FIG. 5, user data regarding image such as photos, the user's profile information, e-mail communications, the user's calendar, and the user's social graph (e.g., friends) are provided in a centralized interface. Further user data may also be provided, as would be understood by one skilled in the art. The centralized interface indicates to the user what information may be accessible to by one or more other online users. The accessibility is further explained below in FIG. 7.

Figure 6:
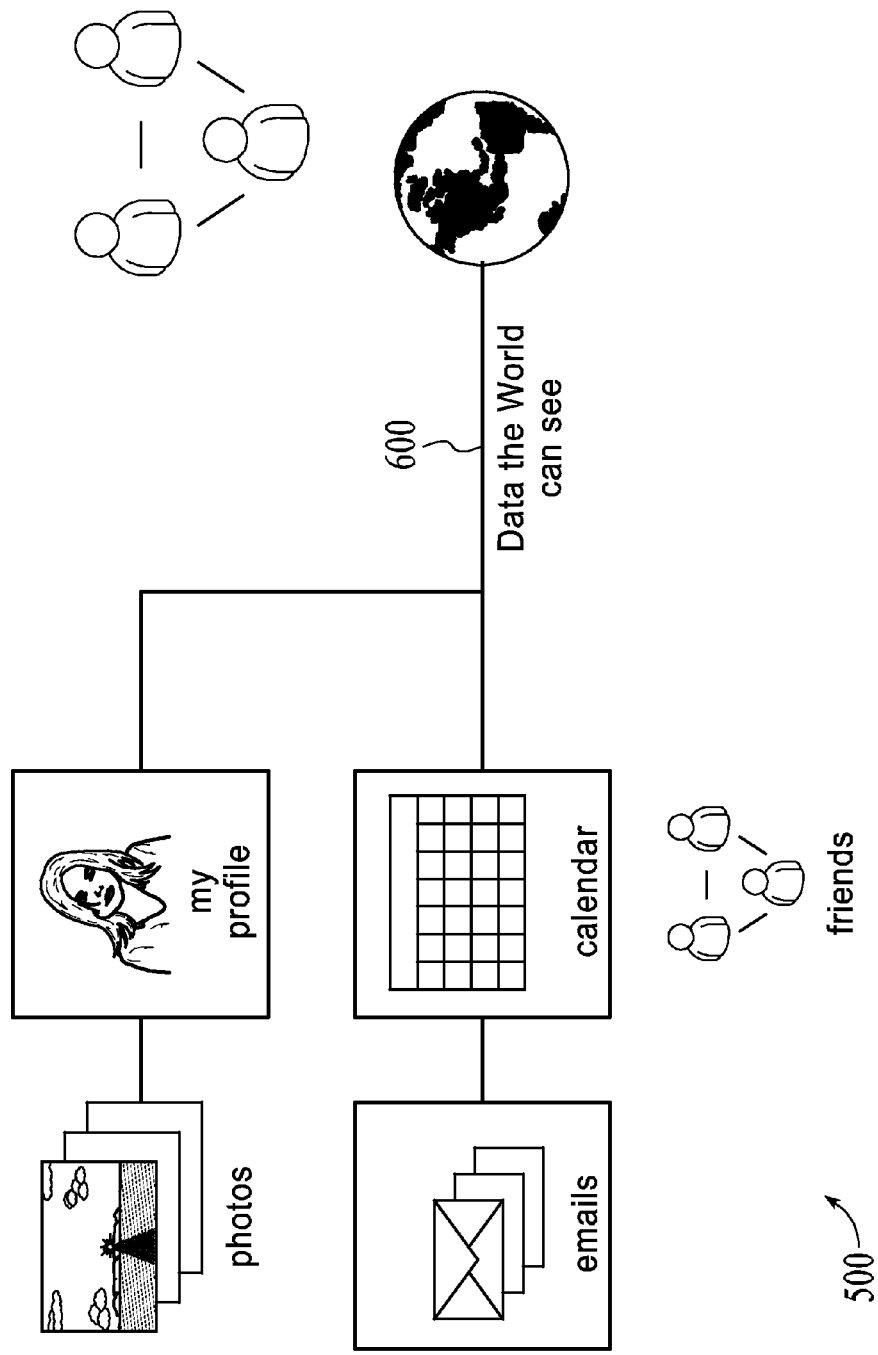
FIG. 6 illustrates an interface for user data with indications for data that is accessible to the public, in accordance with an example embodiment.

For example, FIG. 6 illustrates an interface for user data with indications 600 for data that is accessible to one or more other online users, in accordance with an example embodiment. However, data of images such as photos and data of a social graph such as friends are not accessible to one or more other online users.

Figure 7:
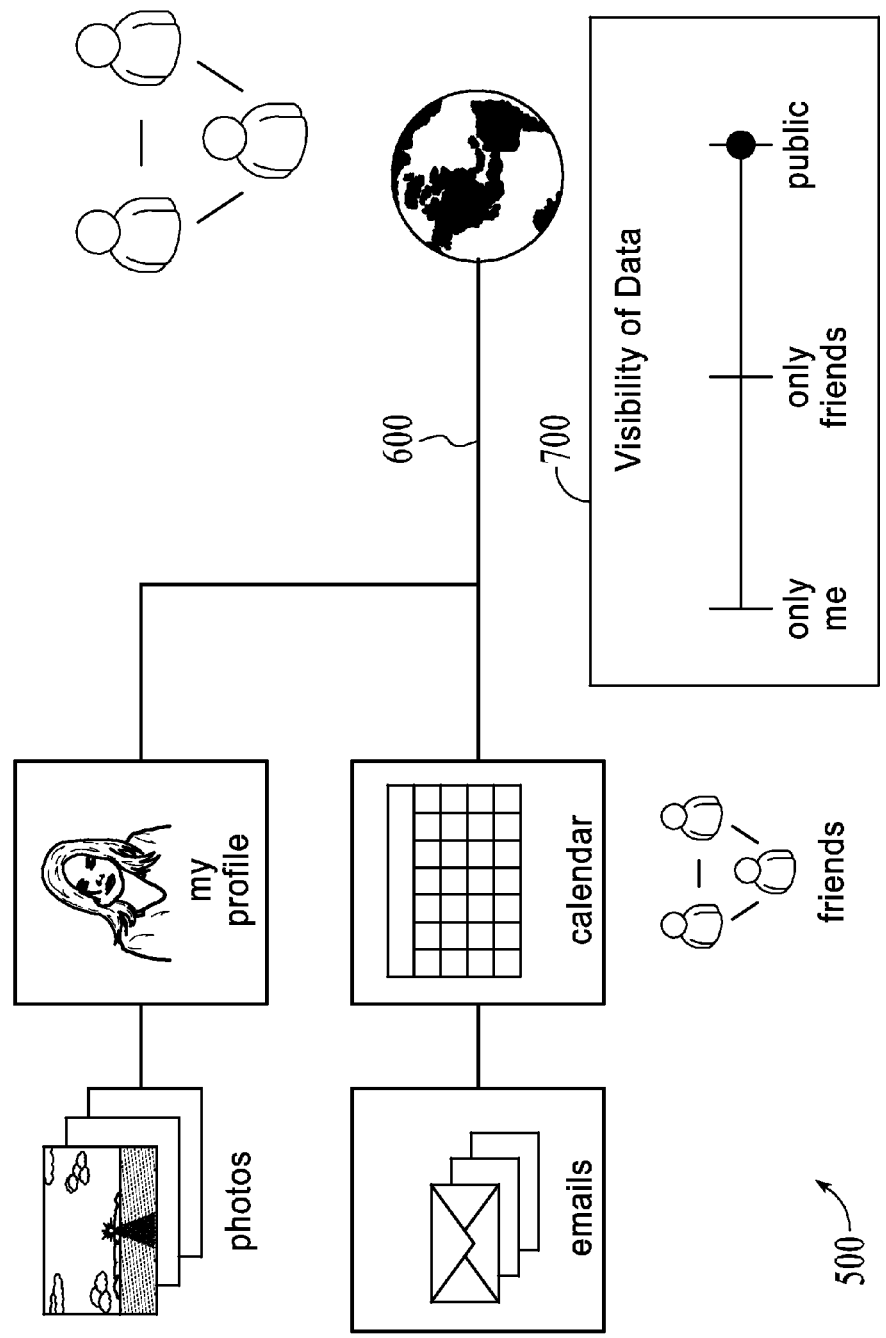
FIG. 7 illustrates an interface for user data, with a privacy settings layer overlaid on the user data interface, in accordance with an example embodiment.

FIG. 7 illustrates an interface for user data, with a privacy settings layer overlaid on the user data interface, in accordance with an example embodiment. In the example of FIG. 7, a privacy settings layer 700 for the user data interface contains privacy settings for the accessibility or visibility of data, which may include setting the visibility of one or more aspects of the user data to be "public" (e.g., shared with all online users), "only friends" (e.g. only shared with the user's social graph), or "only me" (e.g. only visible to the user). In the example of FIG. 7, the visibility of data is set to the "public" setting, whereupon the operating layer indicates the user data that is visible to the public. Thus, in the example of FIG. 7, personal data from the user's profile, e-mails and calendar are indicated 600 as available to the public, and photos and friends are indicated as not available to the public. The style of indication shown in FIG. 7 is merely an example, and other styles, layouts or formats may be adopted as would be understood by one skilled in the art.

Figure 8:
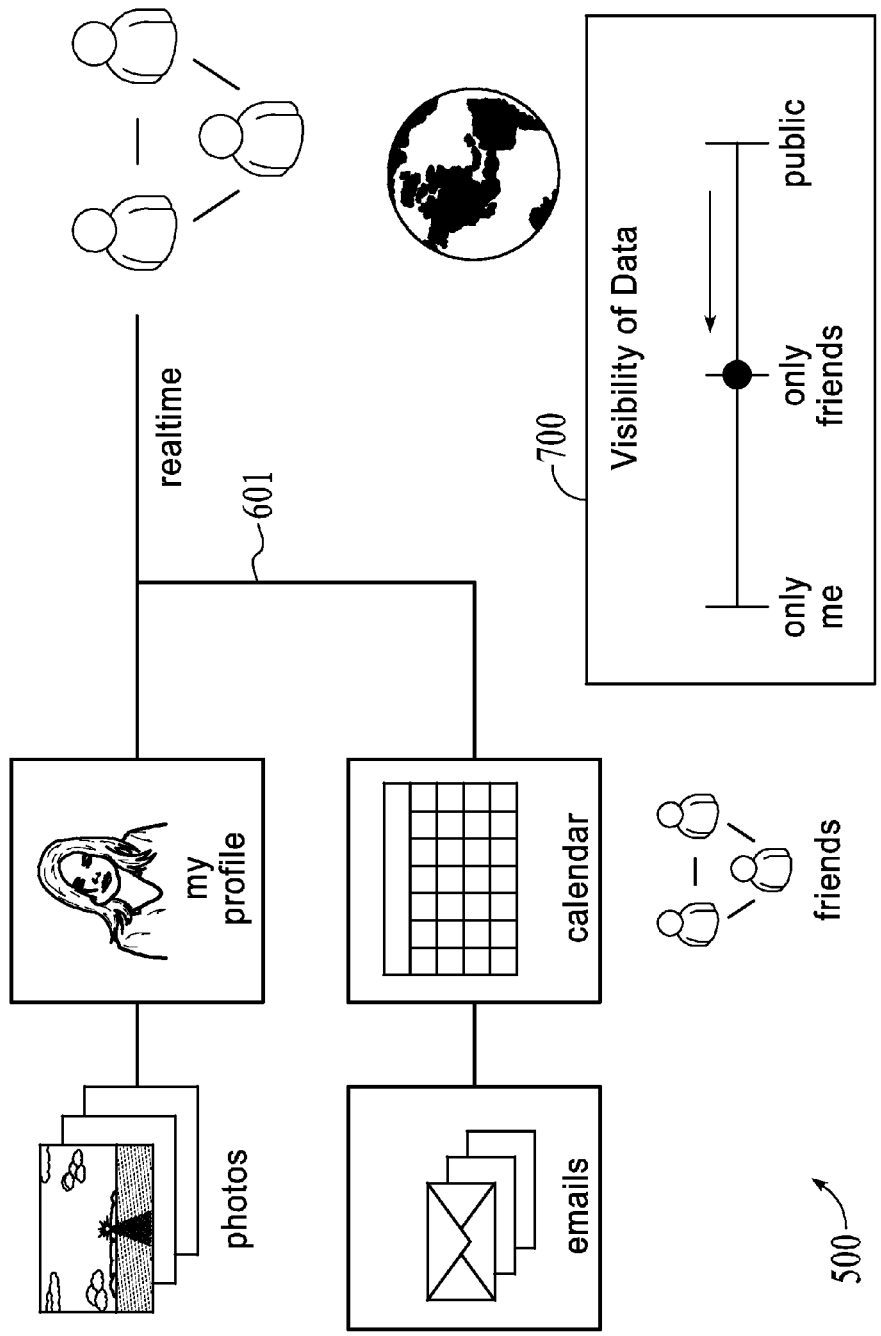
FIG. 8 illustrates an example of changing a privacy setting in the privacy settings layer to change the accessibility of user data, in accordance with an example embodiment.

FIG. 8 illustrates an example of changing a privacy setting in the overlaid privacy settings layer to change the accessibility of user data, in accordance with an example embodiment. In the example depicted in FIG. 8, the visibility of data privacy setting on the privacy settings layer 700 is changed from "public" to "only friends". The setting change is propagated to the user's personal data, and the operating layer 500 is adjusted in real time to incorporate the setting change, which indicates 601 that the user's profile, e-mails and calendar are now accessible only to the user's social graph, as depicted in FIG. 8.

Thus, in real time while a user in using an application, the overlaid settings layer can be used to change the accessibility of profile, email and calendar information from being available to all users to being available only to friends. The non-availability of photo and friend information remains unchanged. There is no occurrence of additional interfaces or stoppage of the application being used by the user, because the settings layer is overlaid on the application. The overlaid settings layer may be opaque, transparent or semitransparent, such that the user can view at least a portion of the display of the application at the overlaid settings layer itself. Further, the overlaid settings layer may be fixed or movable, expandable, collapsible, or closable by a user, as would be understood by one skilled in the art.

In example embodiments, for an application directed to a photo (e.g., image) or document collection, the application layer may include a picture representation of all of the photos or documents in the collection. The overlaid user interface layer may include an adjustable privacy setting for personal view, friends view, and public view so that the user can determine which of the photos or documents are accessible to friends or to the public, respectively. As the user changes the adjustable setting on the overlaid user interface layer, the application layer may highlight or only display the photos or documents for the appropriate audience.

Additional adjustable privacy settings can include permission settings for enabling or disabling which of the photos or documents are accessible to the public or to friends. As the user adjusts the settings for enabling or disabling which of the photos or documents are accessible to the public or to friends, the settings of the application are accordingly adjusted in real-time, and the application layer is adjusted to reflect the changes made in real time. For example, the disabled photos or documents may either have highlighting removed or may be removed in real-time as the user disables sharing of photos or documents.

In example embodiments, the friends view may be further broken down into the user's social graph so the user can enable or disable which of the photos or documents are accessible to certain individuals or groups of individuals. For example, when enabling or disabling the sharing of photos for certain individuals, the photos in the application layer may disappear in real time in response to the user's adjustment, so that the user knows that the specified individuals are no longer capable of accessing the disabled photos. Conversely, adjusting the setting to enable sharing of specific photos may cause the photos in the application to be visible, thereby confirming to the user that the specified individuals can view the photo.

Similar interfaces may also be applied to the personal view or to the public view, as explained above.

In example embodiments, the user interface layer may also indicate what personal information is enabled or disabled for sharing with the application. For example, the user may change the settings on the user interface layer to share geolocation information to a search engine. When the user enables the geolocation information, the search engine results are updated in real time on the application layer to incorporate geolocation information. Similarly, when the user disables the sharing of geolocation information on the user interface layer, the application layer updates in real time to show search results without incorporating geolocation information.

Figure 9:
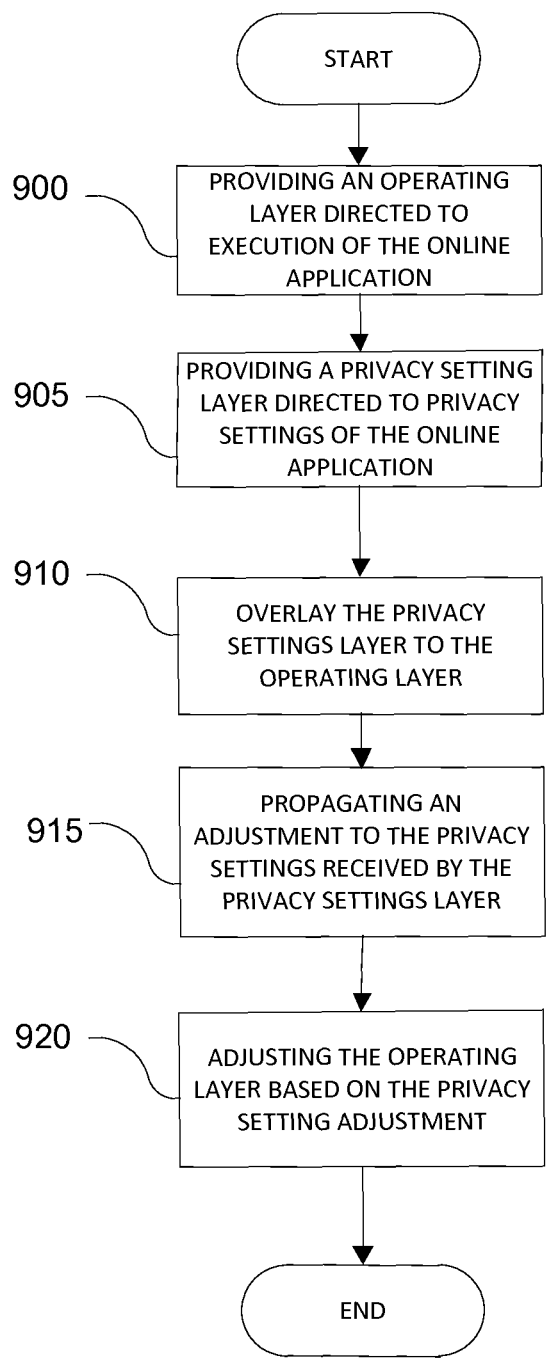
FIG. 9 illustrates a flowchart, in accordance with an example embodiment.

FIG. 9 illustrates a flowchart, in accordance with an example embodiment. In the flowchart depicted in FIG. 9, an operating layer directed to execution of the online computer software application is provided at Step 900. A privacy setting layer may be provided that is directed to privacy settings of the application at Step 905. Optionally, the privacy setting layer may be directed to the privacy settings of the other applications, in addition to the application being used by the user. The privacy settings layer may be overlaid on the operating layer Step 910. Adjustment to the privacy settings received by the privacy settings layer may be propagated to the online computer software application at Step 915, as described in greater detail above. The operating layer may be adjusted based on the privacy setting adjustment at Step 920, as also described in greater detail above. The propagation may be conducted in any manner known to one of ordinary skill in the art. For example, the settings can be directly translated to the setting storage system of the operating layer. The settings may be propagated to a temporary layer to demonstrate the changes to the user, and can be subsequently propagated for final storage (e.g. either by user approval or automatically). Setting to result pairs may be pre-stored, so that for a given setting configuration, the results can be demonstrated quickly. The example embodiments are not limited to the aforementioned examples and may utilize any other implementation known to one of ordinary skill in the art.

Figure 10:
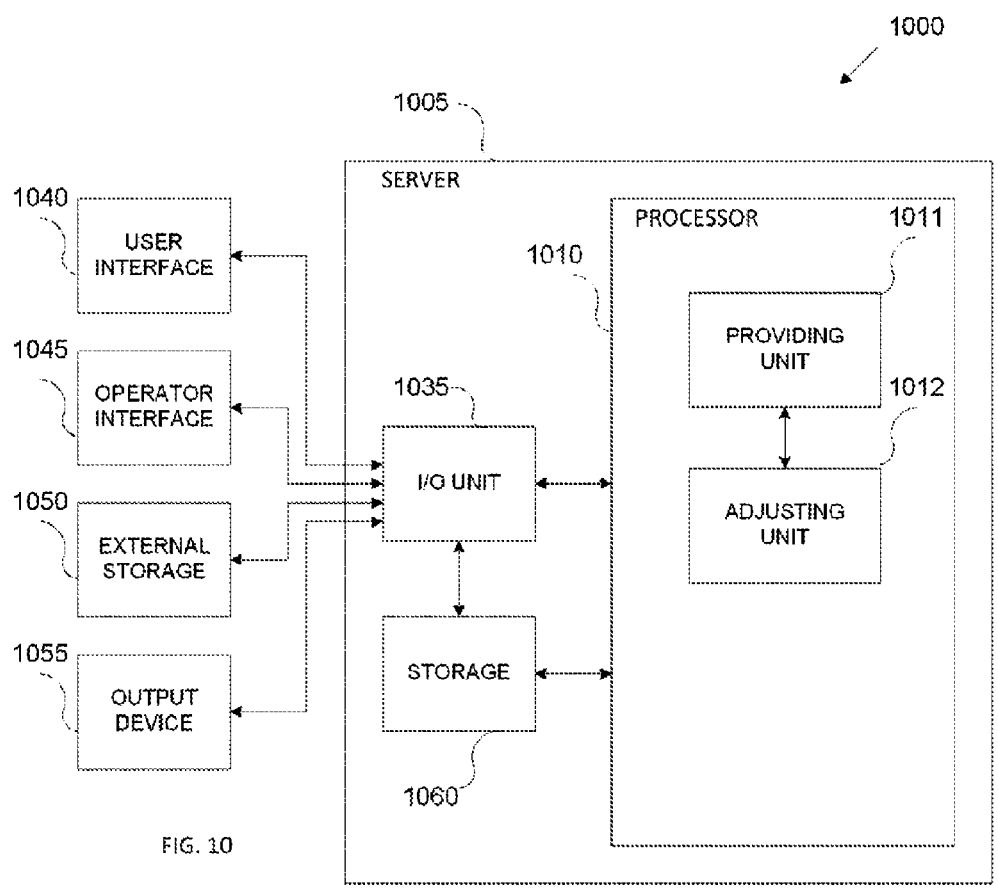
FIG. 10 shows an example computing environment with an example computing device suitable for implementing at least one example embodiment.

FIG. 10 illustrates an example computer system 1000 on which example embodiments may be implemented. The computer system 1000 includes a server 1005 which may involve an I/O unit 1035, storage 1060, and a processor 1010 operable to execute one or more units as known to one of skill in the art. The term "computer-readable medium" as used herein refers to any medium that participates in providing instructions to processor 1010 for execution, which may come in the form of transitory computer readable mediums and non-transitory computer readable mediums. The I/O unit processes input from user interfaces 1040 and operator interfaces 1045 which may utilize input devices such as a keyboard, mouse, touch device, or verbal command. The server 1005 may also be connected to an external storage 1050, which can contain removable storage such as a portable hard drive, optical media (CD or DVD), disk media or any other medium from which a computer can read executable code. The server may also be connected an output device 1055, such as a display to output data and other information to a user, as well as request additional information from a user. The connections from the server 1005 to the user interface 1040, the operator interface 1045, the external storage 1050, and the output device 1055 may via wireless protocols, such as the 802.11 standards, Bluetooth® or cellular protocols, or via physical transmission media, such as cables or fiber optics. The output device 1055 may therefore further act as an input device for interacting with a user.

The processor 1010 may execute one or more units. The providing unit 1011 is operable to provide an operating layer directed to execution of an online computer software application. Providing unit 1011 may be further operable to provide a privacy setting layer that is directed to privacy settings of the application. The privacy settings layer may be overlaid on the operating layer by the providing unit 1011. Adjustment to the privacy settings received by the privacy settings layer may be propagated to the online computer software application by the adjusting unit 1012. The adjusting unit 1012 may then adjust the operating layer based on the adjustment. For example, adjusting unit 1012 may re-execute the online computer software application on the operating layer, or may configure the application to demonstrate the adjustments within the operating layer.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents

What is claimed is:

1. A method of confirming a privacy setting of digital content posted by a first user connected with at least one second user within a social graph of an online social network provided by an online computer social media service application, the method comprising:

provide an operating layer that includes a first interface associated with an execution of the online computer social media service application comprising an application view selected from a first view corresponding to a public privacy setting of the first user, a second view corresponding to the at least one second user for confirming by the first user the visibility of the digital content for the at least one second user, or a third view corresponding to a personal privacy setting of the first user;

providing a privacy setting layer that includes a second interface transparently overlaid on the first interface; the second interface comprising the privacy setting for changing the visibility of the digital content posted by the first user, wherein the first user can enable or disable visibility of the digital content for one of the at least one second user by changing the privacy setting on the second interface;

changing the application view to the second view corresponding to the one of the at least one second user;

using the privacy setting of the second interface to adjust the visibility of the digital content for the one of the at least one second user from visible to not visible and from not visible to visible by the first user, propagating at least one of the adjustments from the second interface to the operating layer, and in response to the propagating, the operating layer changing the visibility of the digital content of within the second view of the first interface in accord with the at least one of the adjustments, wherein the first user may observe the changes to the visibility of the digital content on the first interface through the transparent overlay of the second interface contemporaneous to the at least one of the adjustment without additional interfaces or stoppage of the online computer social media service application, thereby confirming to the first user that the one of the at least one second user's visibility of the digital content corresponds to the at least one of the adjustments.

2. The method of claim 1, wherein the adjustments further comprise changing the view of the online computer social media service application to one of the first view, the second view and the third view of the online computer social media service application, based on the privacy setting for the visibility of the digital content.

3. The method of claim 1, wherein the privacy setting comprises settings for enabling or disabling sharing of the digital content, wherein the operating layer is adjusted such that the online computer social media service application adds or removes the digital content based on the settings for enabling or disabling the sharing of the digital content.

4. The method of claim 1, wherein the privacy setting comprises personalization settings, the online computer social media service application is personalized in response to the personalization settings, and the operating layer is adjusted by applying the personalization settings to the online computer social media service application.

5. The method of claim 1, wherein the online computer social media service application comprises a web search engine and the digital content comprises a web search query, including a result that comprises information associated with the web search query as adjusted by the adjustments.

6. The method of claim 1, wherein the digital content comprises for at least one of (a) geolocation information and (b) image information, including a result that comprises at least one of (a) information associated with a location of a user device and (b) one or more images, respectively, as adjusted by the adjustments.

7. A non-transitory computer readable medium storing instructions for confirming a privacy setting of digital content posted by a first user connected with at least one second user within a social graph of an online social network provided by an online computer social media service application, the instructions comprising:
   providing an operating layer that includes a first interface associated with an execution of the online computer social media service application comprising an application view selected from a first view corresponding to a public privacy setting of the first user, a second view corresponding to the at least one second user for confirming by the first user the visibility of the digital content for the at least one second user, or a third view corresponding to a personal privacy setting of the first user;
   providing a privacy setting layer that includes a second interface transparently overlaid on the first interface; the second interface comprising the privacy setting for changing the visibility of the digital content posted by the first user, wherein the first user can enable or disable visibility of the digital content for one of the at least one second user by changing the privacy setting on the second interface;
   changing the application view to the second view corresponding to the one of the at least one second user;
   using the privacy setting of the second interface to adjust the visibility of the digital content for the one of the at least one second user from visible to not visible and from not visible to visible by the first user,
   propagating at least one of the adjustments from the second interface to the operating layer, and in response to the propagating, the operating layer changing the visibility of the digital content of within the second view of the first interface in accord with the at least one of the adjustments,
   wherein the first user may observe the changes to the visibility of the digital content on the first interface through the transparent overlay of the second interface contemporaneous to the at least one of the adjustment without additional interfaces or stoppage of the online computer social media service application, thereby confirming to the first user that the one of the at least one second user's visibility of the digital content corresponds to the at least one of the adjustments.

8. The non-transitory computer readable medium of claim 7, wherein adjustments comprise changing a view of the online computer social media service application to one of the first view, the second view and the third view of the online computer social media service application, based on the privacy setting for the visibility of the digital content.

9. The non-transitory computer readable medium of claim 7, wherein the privacy setting comprises settings for enabling or disabling sharing of the digital content, wherein the operating layer is adjusted such that the online computer social media service application adds or removes the digital content based on the settings for enabling or disabling the sharing of the digital content.

10. The non-transitory computer readable medium of claim 7, wherein the privacy setting comprises personalization settings, the online computer social media service application is personalized in response to the personalization settings, and the operating layer is adjusted by applying the personalization settings to the online computer social media service application.

11. The non-transitory computer readable medium of claim 7, wherein the online computer social media service application comprises a web search engine and the digital content comprises a web search query, including a result that comprises information associated with the web search query as adjusted by the adjustments.

12. The non-transitory computer readable medium of claim 7, wherein the digital content comprises for at least one of (a) geolocation information and (b) image information, including a result that comprises at least one of (a) information associated with a location of a user device and (b) one or more images, respectively, as adjusted by the adjustments.

13. A server that executes one or more units on a microprocessor, confirming a privacy setting of digital content posted by a first user connected with at least one second user within a social graph of an online social network provided by an online computer social media service application, the server comprising:
   a providing unit configured to provide, by the microprocessor,
      an operating layer that includes a first interface associated with an execution of the online computer social media service application comprising an application view selected from a first view corresponding to a public privacy setting of the first user, a second view corresponding to the at least one second user for confirming by the first user the visibility of the digital content for the at least one second user, or a third view corresponding to a personal privacy setting of the first user; and
      a privacy setting layer that includes a second interface transparently overlaid on the first interface; the second interface comprising the privacy setting for changing the visibility of the digital content posted by the first user, wherein the first user can enable or disable visibility of the digital content for one of the at least one second user by changing the privacy setting on the second interface;

an adjusting unit configured to perform, by the microprocessor, changing the application view to the second view corresponding to the one of the at least one second user; using the privacy setting of the second interface to adjust the visibility of the digital content for the one of the at least one second user from visible to not visible and from not visible to visible by the first user; and propagating at least one of the adjustments from the second interface to the operating layer, and in response to the propagating, the operating layer changing the visibility of the digital content of within the second view of the first interface in accord with the at least one of the adjustments, wherein the first user may observe the changes to the visibility of the digital content on the first interface through the transparent overlay of the second interface contemporaneous to the at least one of the adjustment without additional interfaces or stoppage of the online computer social media service application, thereby confirming to the first user that the one of the at least one second user's visibility of the digital content corresponds to the at least one of the adjustments.

14. The server of claim 13, wherein the adjusting unit is configured to adjust, by the microprocessor, the operating layer based on the privacy setting adjustment by changing a view of the online computer social media service application to one of the first view, the second view and the third view of the online computer social media service application, based on the privacy setting for the visibility of the digital content.

15. The server of claim 13, wherein the privacy setting comprises settings for enabling or disabling sharing of the digital content, wherein the adjustment unit adjusts, by the microprocessor, the operating layer such that the online computer social media service application adds or removes the digital content based on the settings for enabling or disabling the sharing of the digital content.

16. The server of claim 13, wherein the privacy setting comprises personalization settings, the online computer social media service application is personalized in response to the personalization settings, and the adjustment unit adjusts, by the microprocessor, the operating layer by applying the personalization settings to the online computer social media service application.

17. The server of claim 13, wherein the online computer social media service application comprises a web search engine and the digital content comprises a web search query, including a result that comprises information associated with the web search query as adjusted by the adjustments.

18. The server of claim 13, wherein the digital content comprises for at least one of (a) geolocation information and (b) image information, including a result that comprises at least one of (a) information associated with a location of a user device and (b) one or more images, respectively, as adjusted by the adjustments.

* * * * *